US012157246B1

(12) United States Patent
Duncan

(10) Patent No.: US 12,157,246 B1
(45) **Date of Patent: *Dec. 3, 2024**

(54) MACHINE AND METHOD FOR APPLYING TUBULAR SHRINK SLEEVE MATERIAL TO OBJECTS

(71) Applicant: Axon LLC, Raleigh, NC (US)

(72) Inventor: Adam W. Duncan, Apex, NC (US)

(73) Assignee: AXON LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,827

(22) Filed: Feb. 15, 2024

Related U.S. Application Data

(63) Continuation of application No. 18/540,120, filed on Dec. 14, 2023.

(51) Int. Cl.

| | |
|---|---|
| ***B26F 1/20*** | (2006.01) |
| ***B26D 1/14*** | (2006.01) |
| ***B65B 57/04*** | (2006.01) |
| ***B65B 61/02*** | (2006.01) |
| ***B65B 61/12*** | (2006.01) |

(52) U.S. Cl.
CPC ................ *B26F 1/20* (2013.01); *B26D 1/141* (2013.01); *B65B 57/04* (2013.01); *B65B 61/02* (2013.01); *B65B 61/12* (2013.01)

(58) Field of Classification Search
CPC ........... B26F 1/20; B26D 1/141; B65B 57/04; B65B 61/02; B65B 61/12
USPC .............................................................. 83/30
See application file for complete search history.

(56) References Cited

U.S. PATENT DOCUMENTS

| | | | | |
|---|---|---|---|---|
| 4,597,820 A * | 7/1986 | Nozaka | ................ | B65H 19/102 83/365 |
| 4,765,121 A | 8/1988 | Konstantin | | |
| 5,179,819 A | 1/1993 | Sukeyasu | | |
| 5,433,057 A | 7/1995 | Lerner | | |
| 5,737,900 A | 4/1998 | Konstantin | | |
| 5,779,851 A * | 7/1998 | Ifkovits | .................. | B65H 21/00 156/506 |

(Continued)

FOREIGN PATENT DOCUMENTS

| | | | | |
|---|---|---|---|---|
| DE | 102014216192 A1 * | 2/2016 | ................ | B26F 3/02 |
| DE | 102014216193 A1 * | 2/2016 | ............. | B65B 53/00 |

(Continued)

OTHER PUBLICATIONS

DE 102014216192 A1 and Translation (Year: 2024).*
Translation DE202020103235 (Year: 2024).*

*Primary Examiner* — Nhat Chieu Q Do
(74) *Attorney, Agent, or Firm* — THOMPSON HINE LLP

(57) ABSTRACT

A machine for applying tubular film to objects includes a mandrel about which a tubular film is passed, a perforation assembly for forming a perforation line across a width of the tubular film prior to the tubular film moving onto the mandrel, and a sleeve ejection arrangement associated with the mandrel to separate the tubular film along the perforation line to create a tubular sleeve that is ejected off of the mandrel and onto an object. The perforation assembly includes a perforation unit mounted for movement across the width the tubular film, the perforation unit including a perforation blade that is rotated over the tubular film, to apply the perforation line, as the perforation unit moves across the width of the tubular film.

11 Claims, 11 Drawing Sheets

(56) References Cited

U.S. PATENT DOCUMENTS

| | | | | |
|---|---|---|---|---|
| 6,860,184 | B1 | 3/2005 | Chen | |
| 6,966,164 | B2 | 11/2005 | Navarro | |
| 8,621,745 | B2 | 1/2014 | Deonarine | |
| 9,227,335 | B2 | 1/2016 | Duncan | |
| 9,334,073 | B2 | 5/2016 | Heeman | |
| 9,643,743 | B2 * | 5/2017 | Heeman | B29C 63/423 |
| 9,889,960 | B2 | 2/2018 | Duncan | |
| 10,287,045 | B2 | 5/2019 | Duncan | |
| 2006/0053994 | A1 * | 3/2006 | Carrillo | B26D 1/185<br>83/485 |
| 2018/0141695 | A1 * | 5/2018 | Duncan | B65C 3/24 |
| 2020/0017251 | A1 | 1/2020 | Duncan | |
| 2021/0371264 | A1 * | 12/2021 | Duncan | B67B 5/036 |
| 2022/0161953 | A1 | 5/2022 | Duncan | |

FOREIGN PATENT DOCUMENTS

| | | | | |
|---|---|---|---|---|
| DE | 202020103235 | U1 * | 10/2021 | |
| EP | 0421497 | A1 * | 5/1990 | |
| GB | 2097356 | A * | 11/1982 | B65B 61/02 |

* cited by examiner

MACHINE AND METHOD FOR APPLYING TUBULAR SHRINK SLEEVE MATERIAL TO OBJECTS

TECHNICAL FIELD

The present application relates generally to machines that apply tubular shrink sleeve material to objects, such as containers, and, more particularly, to a system and method for perforating tubular film to define individual shrink sleeves prior to application of the shrink sleeves to objects.

BACKGROUND

Tubular shrink sleeve application devices commonly utilize a mandrel over which a tubular shrink film is moved to expand the film int sleeve shape prior to application. In a first type of such a machine, the film is cut, while on the mandrel, by a knife assembly, to form the sleeves. In a second type of such a machine, the perforation lines are applied to the tubular film, while the film is flat and prior to movement onto the mandrel, and the individual sleeves are formed by separation along the perforation lines.

It would be desirable and advantageous to provide a system and method that improves on the perforating technique of the second type of machine.

SUMMARY

In one aspect, a machine for applying tubular film to objects includes a mandrel about which a tubular film is passed, a perforation assembly for forming a perforation line across a width of the tubular film prior to the tubular film moving onto the mandrel, and a sleeve ejection arrangement associated with the mandrel to separate the tubular film along the perforation line to create a tubular sleeve that is ejected off of the mandrel and onto an object. The perforation assembly includes a perforation unit mounted for movement across the width the tubular film, the perforation unit including a perforation blade that is rotated over the tubular film, to apply the perforation line, as the perforation unit moves across the width of the tubular film.

In another aspect, a machine for applying tubular film to objects includes a path along which a tubular film is passed toward a sleeve eject location located above a conveyor for conveying objects, a perforation assembly for forming a perforation line across a width of the tubular film, and a sleeve ejection arrangement associated located proximate to the sleeve eject location to separate the tubular film along the perforation line to create a tubular sleeve that is ejected onto an object moving along the conveyor. The perforation assembly comprises a perforation blade that is rotated over the tubular film to apply the perforation line.

In another aspect, a method is provided for forming perforation lines across a width of a tubular film that travels within a machine for applying tubular film sleeves to objects, where the method involves: utilizing a perforation unit that includes a perforation blade; and moving the perforation unit across the width of the tubular film while the perforation blade is engaged with the tubular film such that the perforation blade is rotated over the tubular film, to apply the perforation line, as the perforation unit moves across the width of the tubular film.

The details of one or more embodiments are set forth in the accompanying drawings and the description below. Other features, objects, and advantages will be apparent from the description and drawings, and from the claims.

DETAILED DESCRIPTION

Figure 1:
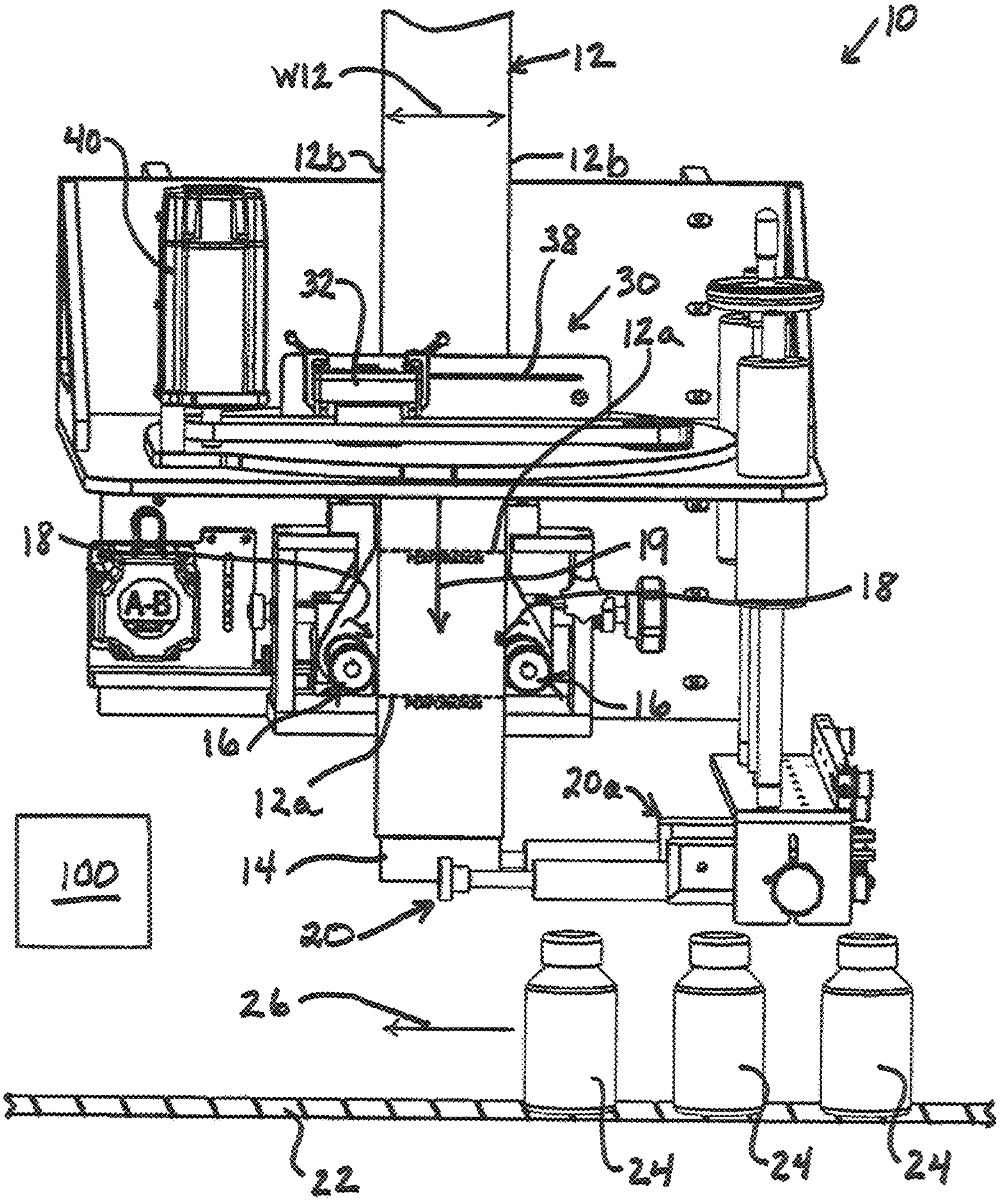
FIG. 1 is a perspective schematic view of a tubular shrink sleeve applying machine.
Figure 2:
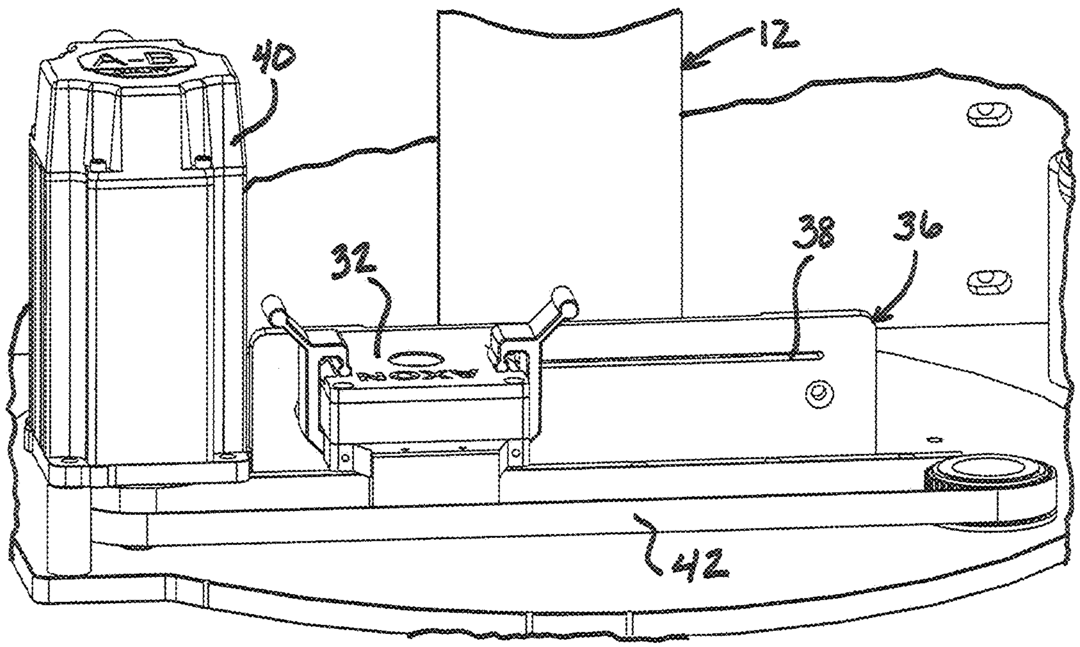
FIGS. 2 and 3 are perspective views of a perforation region of the machine.
Figure 3:
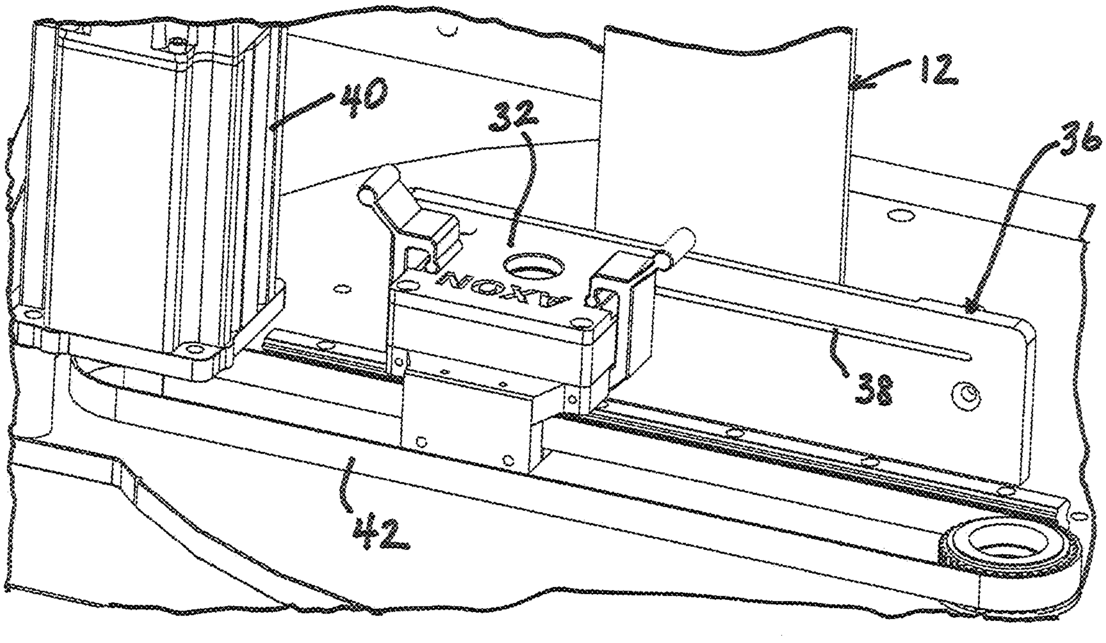
Figure 3A:
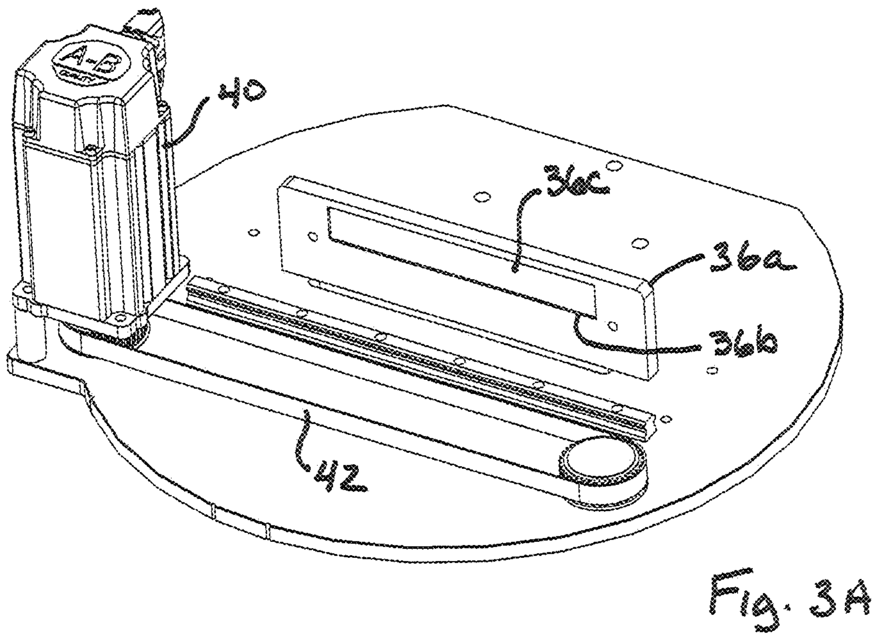
FIGS. 3A-3D are perspective views of the perforation region showing sequential build-up of the perforation assembly.
Figure 3B:
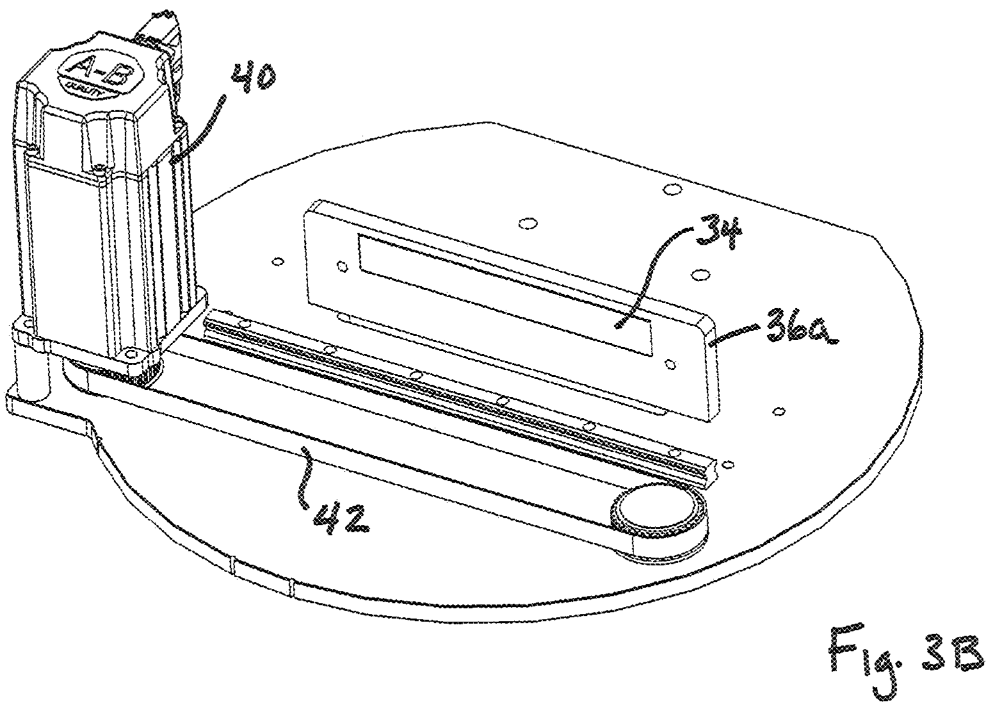
Figure 3C:
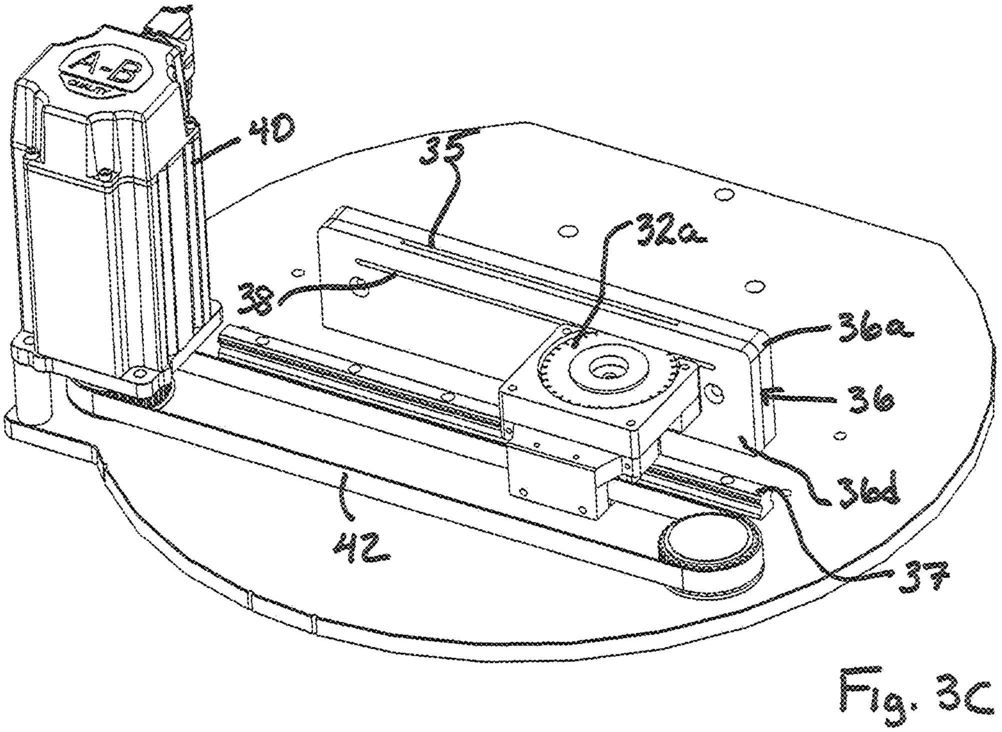
Figure 3D:
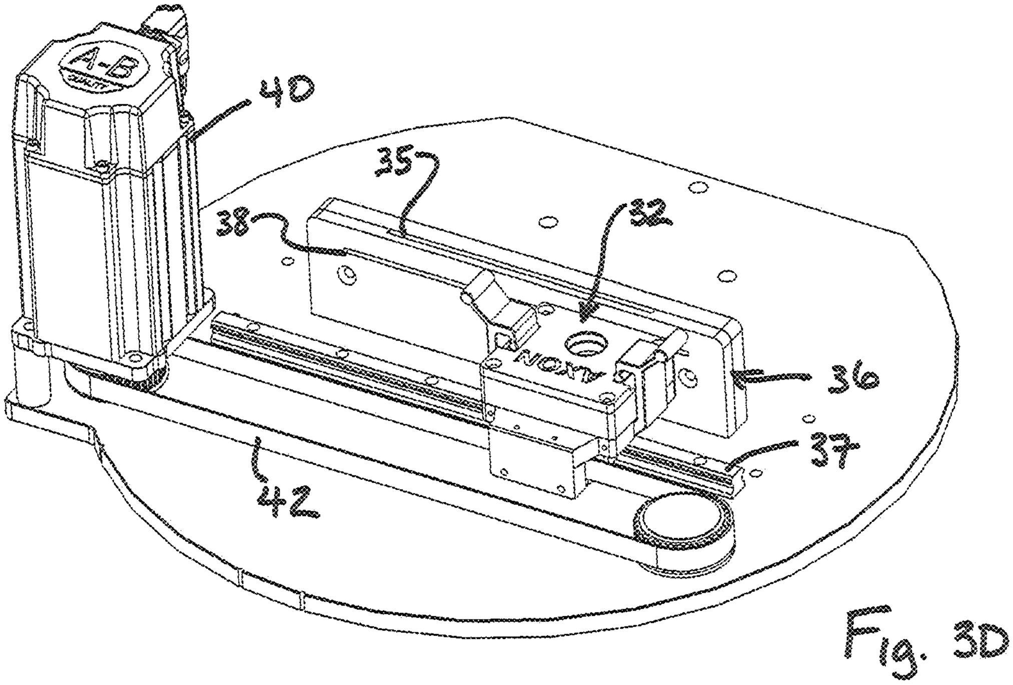
Figure 4:
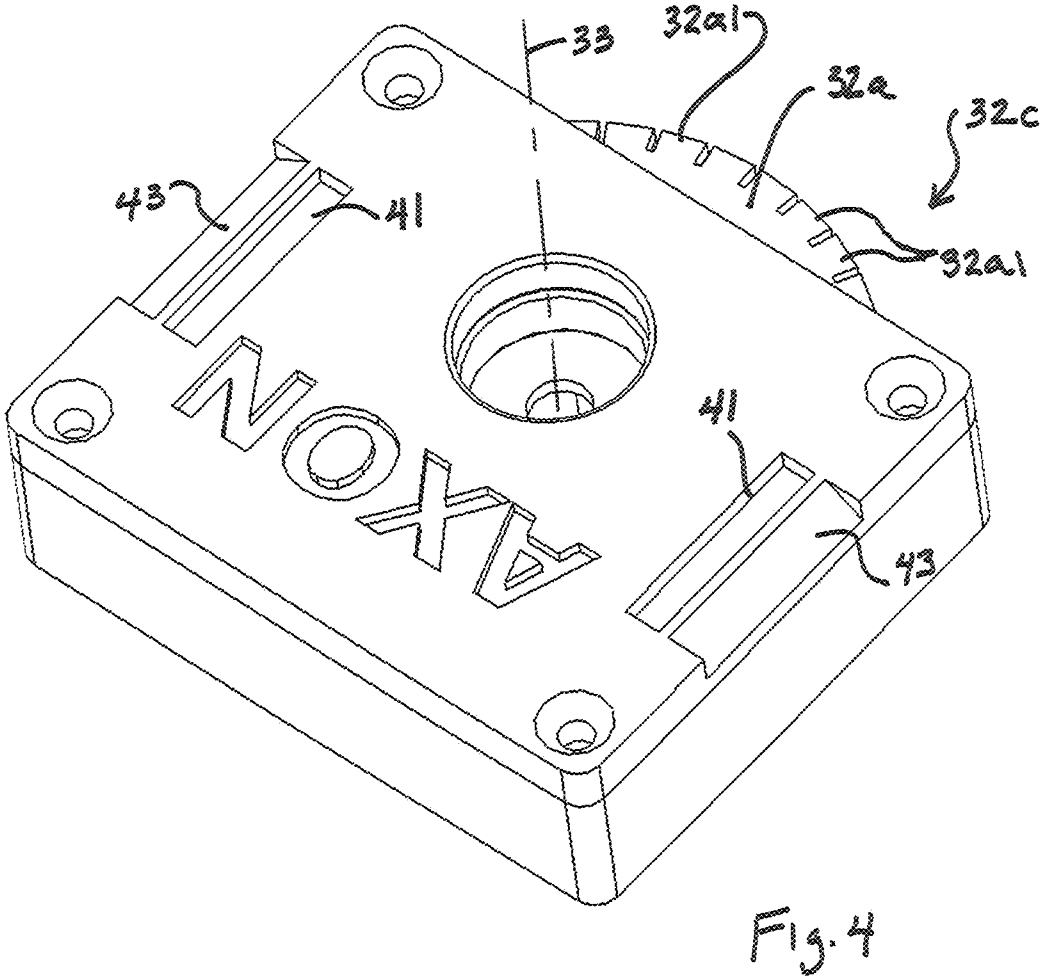
FIG. 4 is a perspective view of a blade cassette.
Figure 5A:
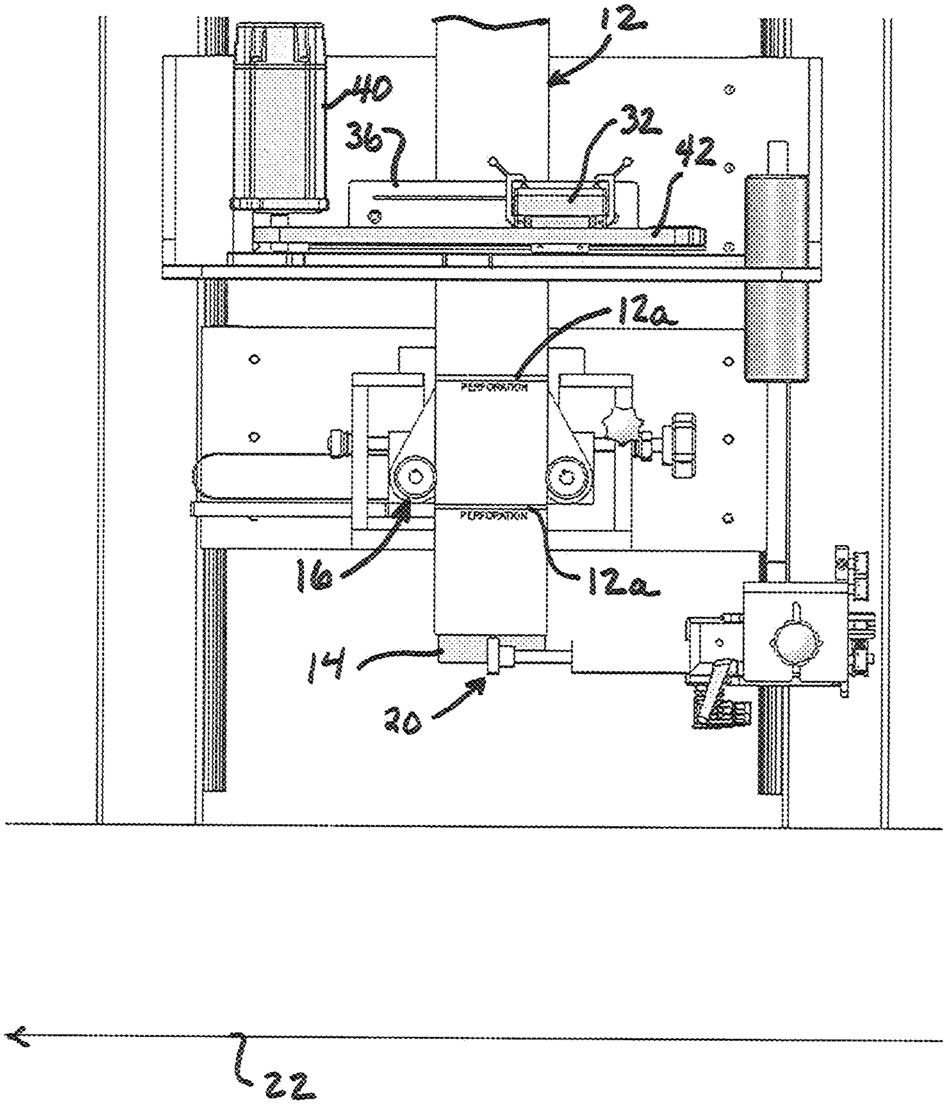
FIGS. 5A-5D show an exemplary sequence of sleeve separation.
Figure 5B:
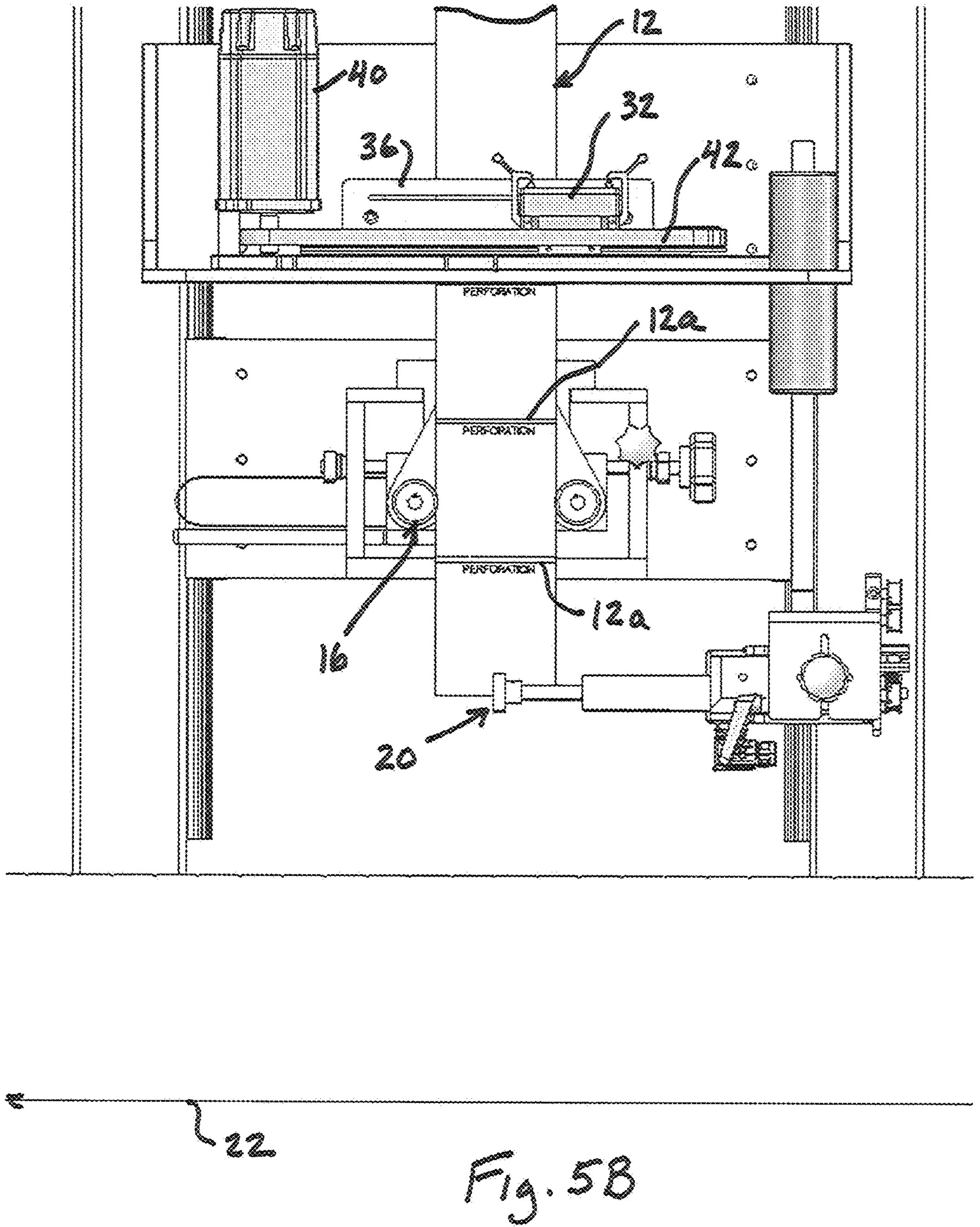
Figure 5C:
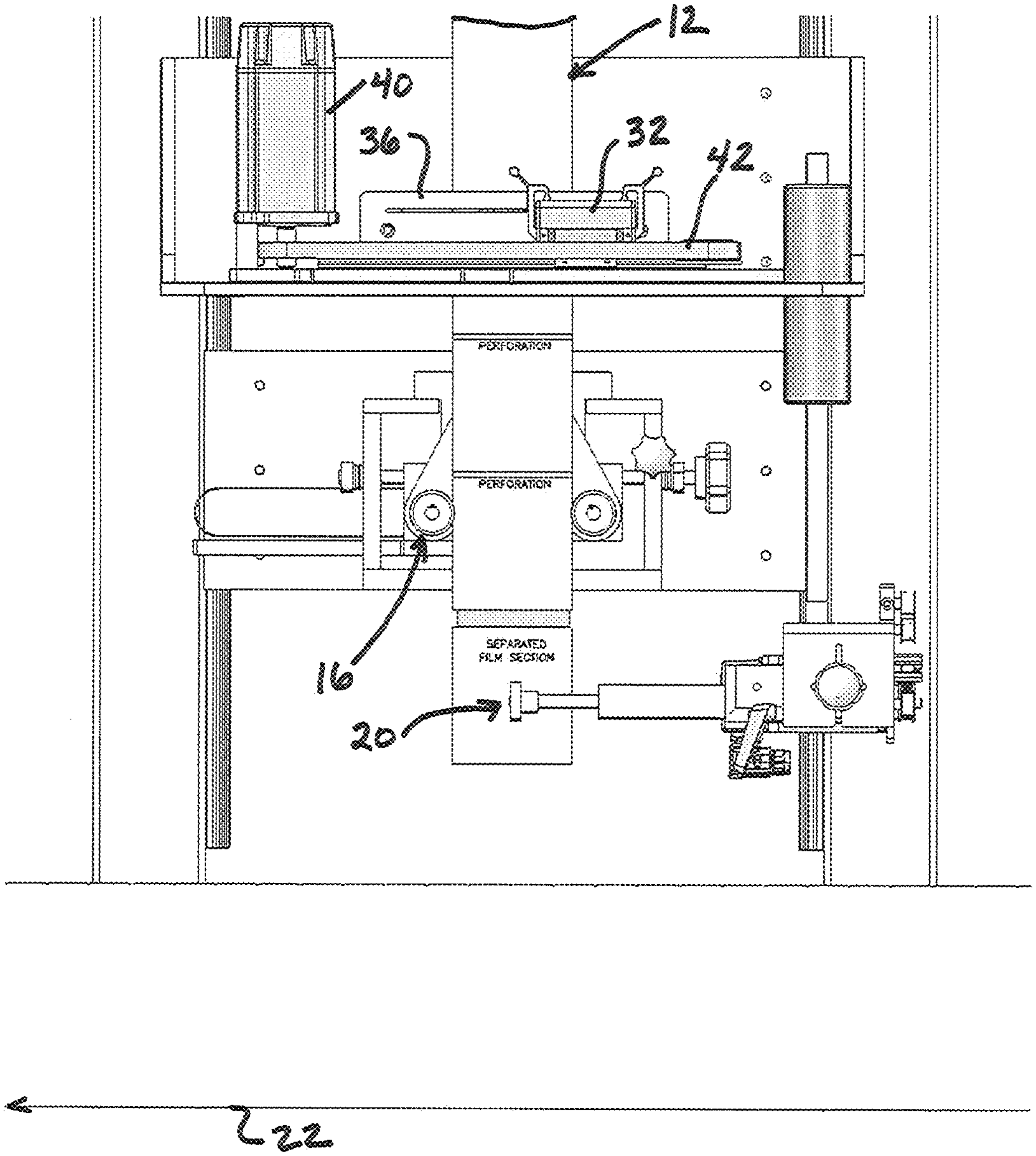
Figure 5D:
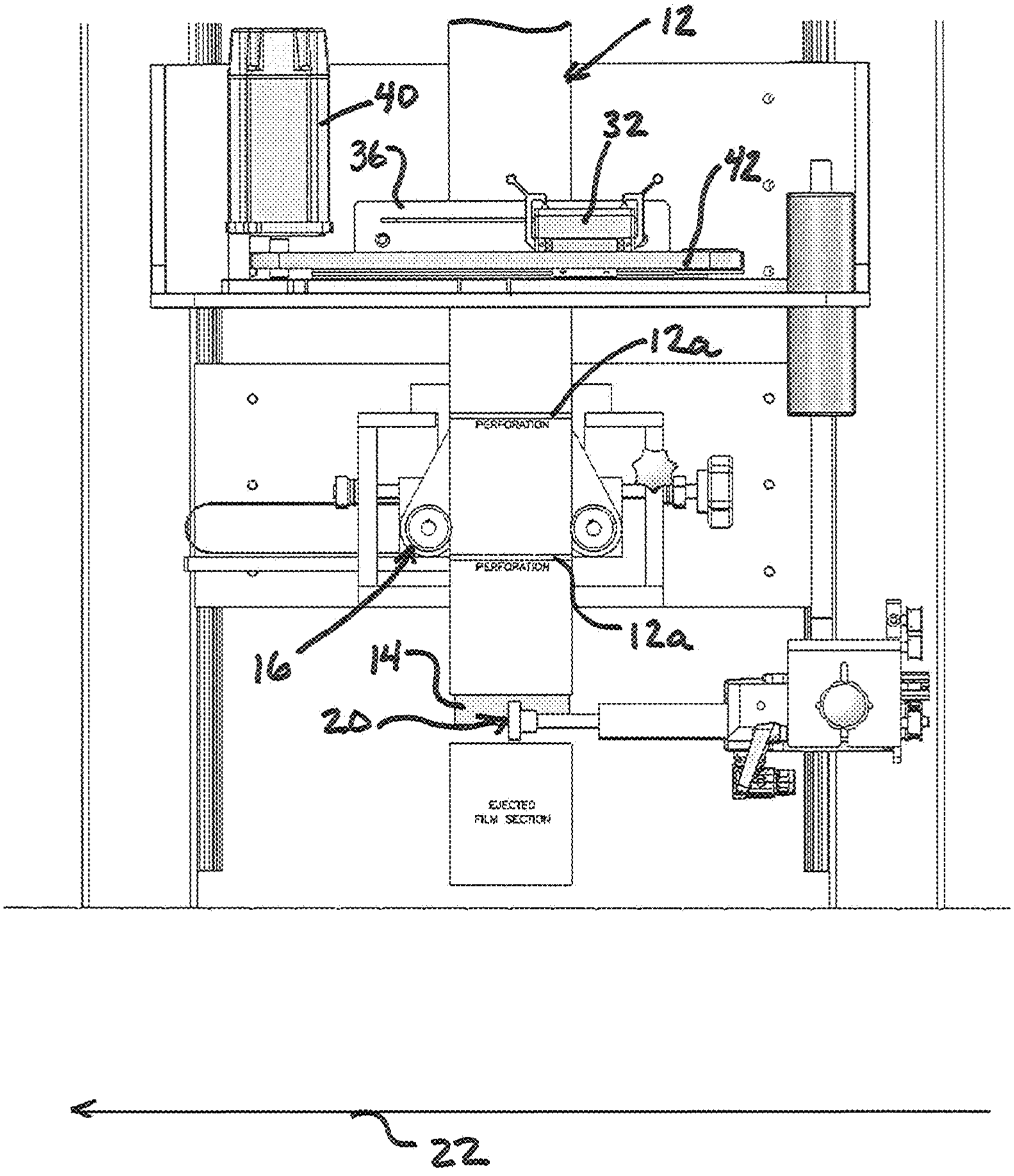

Referring to FIGS. 1-3, 3A-3D and 4, an exemplary tubular shrink sleeve applying apparatus and portions thereof are shown schematically. The apparatus includes a roll or other supply of tubular film 12 that is delivered onto a tooling mandrel 14, which may be a single piece or multiple assembled pieces. The top of the tooling mandrel 14 is shaped to cause the tubular film to spread from its flat orientation to an expanded orientation as it moves down around the mandrel 14. A set of film drive rollers 16, with associated drive unit 16*a* (e.g., motor), are driven (per arrows 18) to control feeding of the film downward along the mandrel (e.g., per arrow 19) toward sleeve eject rollers 20 having an associate drive unit 20*a* (e.g., motor), where the rollers 20 are on diametrically opposite sides of the mandrel 14.

An object conveyance mechanism 22 passes beneath the mandrel and carries objects 24, here in the form of containers, in a conveyance direction 26 such that tubular film sleeves are moved off the mandrel and onto the containers or other objects passing thereby. A downstream application of heat can then be used to shrink the film.

A perforation assembly 30 is located upstream of the mandrel 14 for forming perforation lines 12*a* across the width W12 of the tubular film. Here, the perforation assembly includes a perforation unit 32 mounted for movement across the width the tubular film, where the perforation unit includes a perforation blade 32*a* that is disc-shaped and is rotated over the tubular film, to apply the perforation line, as the perforation unit 32 moves across the width of the tubular film. A spring loaded plate member 34, which operates as an anvil for the blade, is positioned on one side of a path of the tubular film, so as to lie along one face of the flattened tubular film, and the perforation unit 32 is positioned on the other side of the path of the tubular film such that the perforation blade 32*a* presses against the tubular film 12 and the plate member 34 to cause rotation of the perforation blade 32*a* as the perforation unit moves across the width of the tubular film. Thus, the plate member 34 is always in bias against the perforation blade 32*a* and the interaction of the perforation blade 32*a* with the plate member 34 primarily causes rotation of the perforation blade 32*a*. This configuration allows the perforation blade 32*a* to be mounted in a free-wheeling manner, on or in the perforation unit 32, for free rotation about an axis 33. In an alternative arrangement, the perforation unit 32 could be spring-biased toward the plate member 34, in which case the plate member 34 may be fixed or also spring-biased.

Here, the plate member 34 is positioned within a guide block 36 having a vertically running through passage (per upper slot 35) through which the tubular film 12 runs. The guide block is formed by a rear plate 36*a* having a recess 36*b* into which a rubber strip material 36*c* is placed to provide biasing of the plate member 34, which overlies the strip material 36*c*. A front plate 36*d* of the guide block is secured rear plate 36*a* and includes a side slot 38 facing the perforation unit 32. The perforation blade 32*a* extends into and through the side slot 38 to engage the tubular film 12 and the plate member 34. The plate member 34 is biased, via the rubber material acting as the spring material, toward the side slot 38. The perforation blade 32*a* includes a peripheral perforating edge defined by a series of peripheral teeth 32*a*1 that sequentially engage with the tubular film 12 to perforate the tubular film and apply the perforation lines. In order to allow the tubular film to feed through the guide block 36, the perforation blade 32*a* moves beyond the lateral edges 12*b* of the tubular film 12 after moving across the width of the tubular film to form each perforation line, such that the perforation blade 32*a* does not interfere with the tubular film during advance.

In implementations, in order to maintain a desired spacing of the perforation unit 32 from the guide block 36 and/or vertical alignment between the perforation blade 32*a* and the side slot 38, the perforation unit 32 may ride on a bearing rail 37. Alternatively, the perforation unit may ride within a slot (e.g., a guide pin or bearing or other projecting part at the bottom of the housing of perforation unit 32 extends into and rides along an upwardly facing slot).

Here, the perforation unit 32 includes a lower carriage part 32*b*, which is connected to the belt and rides on the bearing rail 37, and an upper blade cassette 32*c* within which the blade is located. The upper blade cassette 32*c* is removably attached to the carriage part 32*b* by a pair of opposed pivoting latching clamps 39 that are pivotably mounted to the carriage part 32*b*. The latching clamps 39 are engage onto/into latching recess features 41 at the upper sides of the blade cassette 32*c* to hold the blade cassette in place during use. Pivoting the latching clamps 39 away from the sides of the blade cassette allows the blade cassette to be easily replaced, when needed, without requiring the use of tools. The edge chamfer features 43 of the sides of the cassette guide the latching parts of the latching clamps back into engagement with the recess features 41 when a cassette is being secured to the carriage part 32*b*.

Figure 6A:
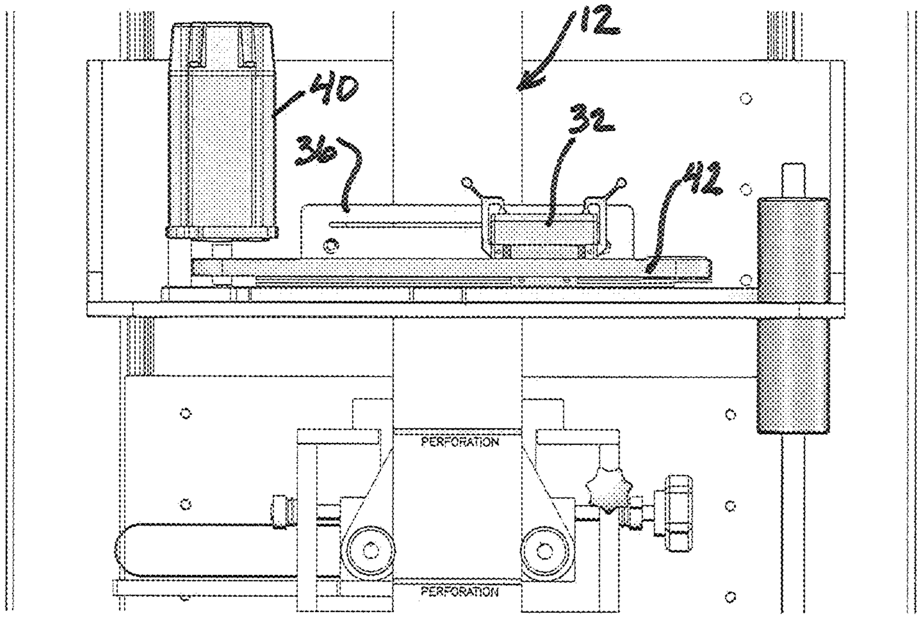
FIGS. 6A-6B show an exemplary sequence of perforation unit movement.
Figure 6B:
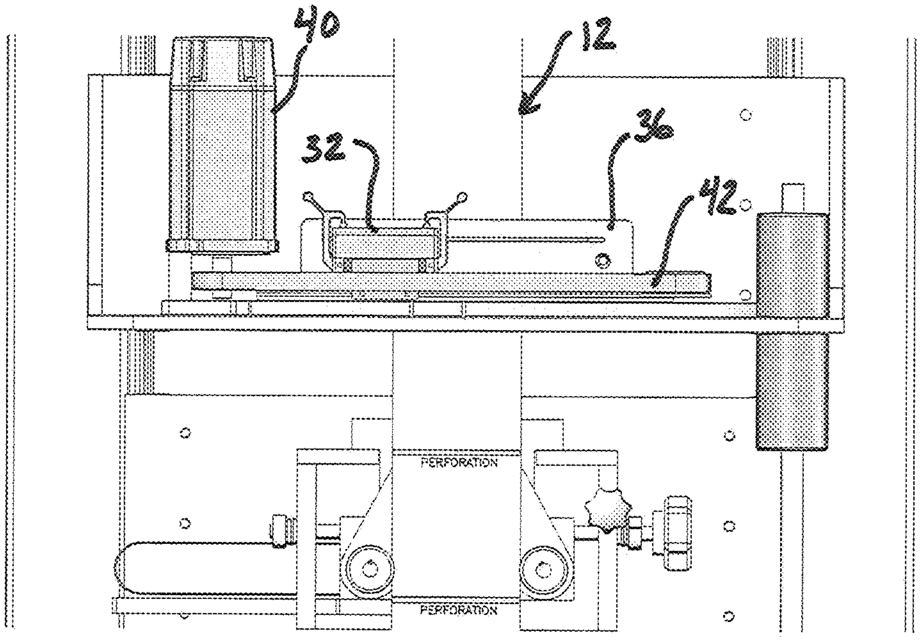
Figure 7:
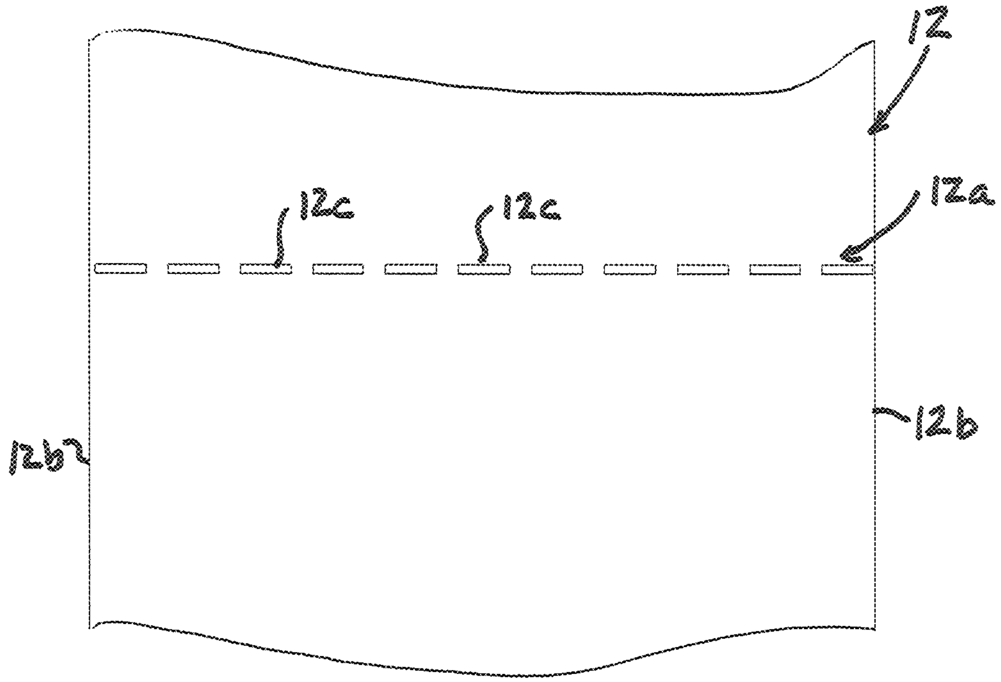
FIG. 7 shows an exemplary perforation line across the width of a tubular film.

FIGS. 5A-5D show an exemplary sequence of sleeve separation along a perforation line and ejection of such a sleeve (e.g., which may be triggered based upon detected position of a container or other object moving below the mandrel). FIGS. 5A-5D show an exemplary sequence of perforation unit movement (from right to left as between the positions of FIGS. 6A and 6B, by driving the belt 42 in a first direction) to create a perforation line the tubular film 12. A next perforation line in the tubular film would be formed by moving the perforation unit in the opposite direction (e.g., from left to right relative to the views of FIGS. 6A-6B, by driving the belt 42 in a second direction, opposite the first direction).

A control system, including a controller 100, is configured to selectively move the perforation unit 32 back and forth across the width of the of the tubular film in first and second opposite directions such that perforation lines are alternately formed in the tubular film while moving in the first direction and the second direction. As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group—including hardware or software that executes code), software, firmware and/or other components, or a combination of some or all of the above, that carries out the control functions of the device or the control functions of any component thereof.

In one implementation of such a control system, a tubular film feed system, which may include the rollers 16 and/or additional rollers along the film path, is provided, along with a drive 40 (e.g., motor) for moving the perforation unit 32 (e.g., via drive 40 moving a continuous belt 42 to which the perforated unit 32 is attached). The controller 100 is configured to: (i) operate the film feed system to feed the tubular film by a length corresponding to a set length for tubular sleeves and then stop film feeding, (ii) operate the drive 40 such that, after film feeding has stopped, the perforation unit moves across the width of the film in a first direction (e.g., right to left in the drawings) to create a first perforation line in the tubular film, (iii) after creation of the first perforation line, operate the film feed unit to feed the tubular film by a length corresponding to the set length and then stop film feeding, (iv) operate the drive such that, after film feeding has stopped, the perforation unit moves across the width of the film in a second direction (e.g., left to right in the drawings) to create a second perforation line in the tubular film.

During each of steps (i) and (iii) above, the leading end of the tubular film will be fed into alignment with the rollers 20, which will cause the leading end of the film to separate along the leading perforation line 12*a*, creating a tubular sleeve that is ejected down onto a passing container or other object (e.g., per the sequence of FIGS. 4A-4D).

In one implementation of steps (ii) and (iv) above, the controller may wait until film feeding stops to activate the drive 40 to move the perforation unit 32. In another implementation of steps (ii) and (iv) above, because the perforation blade 32*a* is initially laterally offset from the tubular film, the drive 40 could be activated to move the perforation unit 32 a short time before film feeding stops, with timing being coordinated such that the film feeding stops at or before a time when the perforation blade 32*a* makes contact with the tubular film.

The above-described sequence repeats as the sleeves are separated from the tubular film 12 along the perforation lines and ejected onto the moving objects. In this regard, the drive 20*a* for the rollers 20 may, in one embodiment, be operated continuously, in which case the advance of the leading end of the tubular film 12 down into the region of the rollers 20 causes the rollers to engage the leading end of the tubular film. The rollers 20 are operated at a speed greater than the feed speed of the rollers 16, such that the engagement of the rollers 20 on the film pulls the leading end of the tubular film with a force sufficient to separate the tubular film along the leading perforation line 12*a* to create an individual tubular sleeve that ejects onto the passing object. In other embodiments, the controller 100 may be configured to selectively operate the drive 20*a* rotate the ejection rollers 20 on an as needed basis.

FIG. 6 shows an exemplary configuration of a perforation line 12*a* across the width of the tubular film, which here runs in a direction substantially perpendicular to the side edges 12*b* of the tubular film 12. Each through slot or cut 12*c* making up the perforation line is elongated in shape and a uniform spacing between the cuts or slots 12c is provided. However, in other variations, the shape could vary (e.g., round or oval or square cuts or openings) and the spacing therebetween could vary. Moreover, perforation lines that are not substantially perpendicular to the side edges of the tubular film might also be implemented in certain circumstances for certain objects (e.g., by orienting the guide block 36 run direction of the perforation unit 32 at an angle offset from perpendicular to the movement direction of the tubular film through the guide block 36).

It is to be clearly understood that the above description is intended by way of illustration and example only, is not intended to be taken by way of limitation, and that other changes and modifications are possible.

The invention claimed is:

1. A machine for applying tubular film to objects, the machine including:

a mandrel about which a tubular film is passed;

a perforation assembly positioned for forming a perforation line across a width of the tubular film while the tubular film is in a flat orientation prior to the tubular film moving onto the mandrel;

a control system configured to selectively move the perforation unit back and forth across the width of the tubular film in first and second opposite directions such that perforation lines are alternately formed in the tubular film while moving in the first direction and the second direction;

a sleeve ejection arrangement configured with at least one roller to engage and pull a leading end of the tubular film so as to separate the leading end from the tubular film along the perforation line to create a tubular sleeve that is ejected off of the mandrel and onto an object by rotation of the roller, wherein the perforation assembly comprises a perforation unit mounted for movement across the width the tubular film, the perforation unit including a perforation blade mounted for rotation about an axis, wherein the perforation blade includes a peripheral edge that is rotated over and in contact with the tubular film in a direction across the width of the tubular film and perforates the tubular film as the perforation blade, including the rotation axis of the perforation blade, moves across the width of the tubular film, to apply the perforation lines, and wherein the tubular film moves along a downward path onto the mandrel and the perforation unit is located above the mandrel along the downward path.

2. The machine of claim 1, wherein the perforation assembly further comprises a plate member positioned on a first side of a path of the tubular film in the flat orientation, wherein the perforation unit is positioned on a second side of the path and the peripheral edge presses the tubular film against the plate member as the perforation blade rotates over and in contact with the tubular film.

3. The machine of claim 2, wherein the plate member is positioned within a guide block through which the tubular film in the flat orientation extends, wherein the guide block includes a wall having a side slot facing the perforation unit, and the peripheral edge of the perforation blade extends through the side slot to press the tubular film against the plate member.

4. The machine of claim 2, wherein the plate member is biased toward the perforation blade by the plate member overlying a material that urges the plate member toward the perforation blade.

5. The machine of claim 1, wherein the peripheral edge of the perforation blade includes a series of peripheral teeth that sequentially engage with the tubular film to perforate the tubular film for creating the perforation line.

6. The machine of claim 1, wherein at least part of the peripheral edge of the perforation blade moves beyond an edge of the tubular film after moving across the width of the tubular film.

7. The machine of claim 1, further comprising:

a tubular film feed unit;

a drive for moving the perforation unit;

the control system including a controller configured to (i) operate the film feed unit to feed the tubular film by a length corresponding to a set length for tubular sleeves and then stop film feeding, (ii) operate the drive such that, after film feeding has stopped, the perforation unit moves across the width of the film in a first direction to create a first perforation line in the tubular film, (iii) after creation of the first perforation line, operate the film feed unit to feed the tubular film by a length corresponding to the set length and then stop film feeding, (iv) operate the drive such that, after film feeding has stopped, the perforation unit moves across the width of the film in a second direction to create a second perforation line in the tubular film.

8. The machine of claim 1, wherein the at least one roller is rotated against the tubular film on the mandrel to separate the leading end of the tubular film along the perforation line.

9. The machine of claim 1, wherein the perforation unit is configured to move across the width of the tubular film in a direction such that the resulting perforation line runs substantially perpendicular to side edges of the tubular film.

10. The machine of claim 1, wherein the perforation unit includes a carriage part and a blade cassette part, wherein the blade cassette part carries the perforation blade and is releasably attached to the carriage part to enable a cassette change.

11. The machine of claim 10, wherein the carriage part carries at least one latching clamp that is movable between a retaining position to hold the blade cassette part on the carriage part and a release position that enables removal of the blade cassette part from the carriage part.

* * * * *